(12) United States Patent
Liu et al.

(10) Patent No.: US 10,609,321 B2
(45) Date of Patent: *Mar. 31, 2020

(54) INTERFACING A TELEVISION WITH A SECOND DEVICE

(71) Applicant: Google LLC, Mountain View, CA (US)

(72) Inventors: Eric H C Liu, Santa Clara, CA (US); Haywai Hayward Chan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/179,485

(22) Filed: Nov. 2, 2018

(65) Prior Publication Data

US 2019/0075267 A1 Mar. 7, 2019

Related U.S. Application Data

(63) Continuation of application No. 15/625,505, filed on Jun. 16, 2017, now Pat. No. 10,122,955, which is a
(Continued)

(51) Int. Cl.
*H04N 5/44* (2011.01)
*H04N 21/41* (2011.01)
(Continued)

(52) U.S. Cl.
CPC ....... *H04N 5/4403* (2013.01); *H04N 21/4122* (2013.01); *H04N 21/43615* (2013.01);
(Continued)

(58) Field of Classification Search
CPC ......... H04N 21/4788; H04N 21/43615; H04N 21/6175; H04N 21/4122; H04N 21/4126;
(Continued)

(56) References Cited

U.S. PATENT DOCUMENTS

| 8,356,251 B2* | 1/2013 | Strober | H04N 21/4222 |
| | | | 715/740 |
| 8,793,730 B2* | 7/2014 | Mowrey | H04N 5/44543 |
| | | | 725/133 |

(Continued)

FOREIGN PATENT DOCUMENTS

EP 2547117 1/2013

OTHER PUBLICATIONS

Anonymous, "HyperCard—Wikipedia", last updated Feb. 24, 2013, pp. 1-11, available at: http://www.en.wikipedia.org/w/index.php?title=HyperCard&oldid=540127845, retrieved on Aug. 8, 2018.

(Continued)

*Primary Examiner* — Dhairya A Patel
(74) *Attorney, Agent, or Firm* — Byrne Poh LLP

(57) ABSTRACT

A system and method for interfacing a television with a second device is provided. The system includes an interfacing unit to enter an interfacing mode between the television mode and the second device; a card storage unit to store a first card and a second card, the first card being presently displayed on the television and the second card being previously displayed on the television; a current card display register to store the first card; an interactive retrieval unit to retrieve a plurality of interactive functions associated with the first card; and a display unit to display the first card and the plurality of interactive functions in response to being in the interfacing mode.

19 Claims, 5 Drawing Sheets

Related U.S. Application Data continuation of application No. 13/842,809, filed on Mar. 15, 2013, now Pat. No. 9,712,776.

(51) Int. Cl.
  *H04N 21/436* (2011.01)
  *H04N 21/61* (2011.01)
  *H04L 29/06* (2006.01)
  *H04N 21/4788* (2011.01)

(52) U.S. Cl.
  CPC ..... *H04N 21/6125* (2013.01); *H04N 21/6175* (2013.01); *H04L 67/42* (2013.01); *H04N 21/4126* (2013.01); *H04N 21/4788* (2013.01)

(58) Field of Classification Search
  CPC ..... H04N 21/6125; H04L 67/02; H04L 67/42; H04L 67/2819
  See application file for complete search history.

(56) References Cited

U.S. PATENT DOCUMENTS

| | | | |
|---|---|---|---|
| 9,253,520 B2* | 2/2016 | Shoemake | H04N 5/23206 |
| 9,712,776 B2* | 7/2017 | Liu | H04N 21/43615 |
| 10,122,955 B2* | 11/2018 | Liu | H04N 21/43615 |
| 2004/0259577 A1 | 12/2004 | Ackley | |
| 2009/0259711 A1* | 10/2009 | Drieu | G11B 27/105 709/201 |
| 2010/0281108 A1 | 11/2010 | Cohen | |
| 2011/0060994 A1 | 3/2011 | Maxwell | |
| 2011/0184862 A1 | 7/2011 | Lanier et al. | |
| 2012/0054793 A1 | 3/2012 | Kang et al. | |
| 2012/0137301 A1 | 5/2012 | Roslak et al. | |
| 2012/0144416 A1 | 6/2012 | Wetzer | |
| 2012/0208466 A1* | 8/2012 | Park | G06F 1/1601 455/41.3 |
| 2012/0210226 A1* | 8/2012 | McCoy | H04N 21/25816 715/719 |
| 2012/0233646 A1 | 9/2012 | Conigllo | |
| 2012/0311074 A1 | 12/2012 | Arini et al. | |
| 2013/0343721 A1* | 12/2013 | Abecassis | G11B 27/11 386/241 |
| 2014/0012967 A1* | 1/2014 | Agarwal | H04L 61/1511 709/223 |
| 2014/0089992 A1* | 3/2014 | Varoglu | H04N 21/4122 725/81 |
| 2015/0086174 A1* | 3/2015 | Abecassis | H04N 21/4126 386/201 |

OTHER PUBLICATIONS

Examination Report dated Aug. 16, 2018 in EP Patent Application No. 14722870.4.
Google, "Google Search app Google Now TV Cards", pp. 1-2, available at: https://support.google.com/websearch/answer/3223220?hl=en, retrieved on Jul. 15, 2014.
International Preliminary Report on Patentability and Written Opinion dated Sep. 15, 2015 in International Patent Application PCT/US2014/027302.
International Search Report and Written Opinion of the International Search Authority dated Jul. 24, 2014 in International Patent Application No. PCT/US2014/027302.
Merkel, K., "HbbTV and Second Screen", pp. 1-2, Jan. 7, 2013, available at: http://www.irt.de/fileadmin/media/downloads/Digitales_Fernsehen/HbbTV_und_Second_Screen.pdf, retrieved on Jul. 15, 2014.
Notice of Allowance dated Mar. 27, 2017 in U.S. Appl. No. 13/842,809.
Notice of Allowance dated Jun. 25, 2018 in U.S. Appl. No. 15/625,505.
Office Action dated Feb. 9, 2018 in U.S. Appl. No. 15/625,505.
Office Action dated Feb. 24, 2015 in U.S. Appl. No. 13/842,809.
Office Action dated May 23, 2016 in U.S. Appl. No. 13/842,809.
Office Action dated Aug. 17, 2018 in CN Patent Application No. 201480021780.6.
Office Action dated Oct. 19, 2017 in U.S. Appl. No. 15/625,505.
Office Action dated Dec. 6, 2017 in CN Patent Application No. 201480021780.6.
Examination Report dated Jun. 6, 2019 in EP Patent Application No. 14722870.4.

* cited by examiner

INTERFACING A TELEVISION WITH A SECOND DEVICE

CROSS-REFERENCE TO RELATED APPLICATIONS

This application is a continuation of U.S. patent application Ser. No. 15/625,505, filed Jun. 16, 2017, which is a continuation of U.S. patent application Ser. No. 13/842,809, filed Mar. 15, 2013, each of which is hereby incorporated by reference herein in its entirety.

BACKGROUND

A television is an ideal medium to consume media. Televisions tend to be the largest device a person may own. In addition to television programs, the television may serve other media, such as news, photos, Internet sourced videos and the like.

Televisions may be augmented with an Internet enabling device. The Internet enabling device accesses various data providers to retrieve data to be presented on the television. The various data providers may be a news server, a photo server, or may data providing services. The Internet enabling device may be separate and discrete from the television, or may be integrated into a television design.

The Internet enabling device may access a centralized server that retrieves data from the data providers to serve to the television. The centralized server may serve data to the television based on a user's preferences. For example, the user may register certain preferences, and based on the preferences registered, data from the data providers may be retrieved to serve on the television. Alternatively, the centralized server may access the user's preferences automatically.

The television, through the Internet enabling device, may present the data retrieved from the centralized server in a slideshow fashion. For example, a user who indicates an enjoyment of nature may be presented with various pictures of national parks. Additionally, the slideshow may contain information associated with nature, such as news events and other Internet related recommendations.

The television presentation may be augmented with a content identification ('content-id') capability. The content-id automatically detects the program being watched by the user. The content-id may perform this task by performing a visual, audio or digital detection of the program being served by the television.

While watching television, user's also may access a portable device on their person, such as a smart phone, a tablet or a personal computer. The portable device is interactive in nature, and allows the user to share and process information.

SUMMARY

A system and method for interfacing a television with a second device is provided. The system includes an interfacing unit to enter an interfacing mode between the television mode and the second device; a card storage unit to store a first card and a second card, the first card being presently displayed on the television and the second card being previously displayed on the television; a current card display register to store the first card; an interactive retrieval unit to retrieve a plurality of interactive functions associated with the first card; and a display unit to display the first card and the plurality of interactive functions in response to being in the interfacing mode.

DESCRIPTION OF THE DRAWINGS

The detailed description refers to the following drawings, in which like numerals refer to like items, and in which.

DETAILED DESCRIPTION

While the television is an ideal device for consuming media, the television may be limited in providing a fully interactive experience. Televisions are often not equipped with more than a remote control. Further, user's may not want to interrupt a television broadcast or presentation to perform an interactive operation.

In contrast, a second device associated with the user (or on the user's person) may be fully interactive, or more interactive than a television. For example, the user may maintain a portable device, such as a smart phone or tablet, on their person. The smart phone or tablet may be equipped to access the Internet, communicate with other users, and perform other tasks that a television is not ideal for performing.

A user viewing content on a television, such as a broadcast program or a slideshow served via a centralized server, may manually enter information about the content sourced from a television. However, this process may be burdensome. Further, the user may not be fully aware of the textual details (i.e. name, actors, etc.) associated with the broadcast program, and thus may not be able to manually interact with their phone to perform additional searching.

The systems and methods disclosed herein are directed to interfacing television with a second device, such as a smart phone or tablet. The systems and methods disclosed herein allow a user, via a user device to access and interact with data sourced from a centralized server, the data being served to a television.

Thus, because the data is served to a television is automatically served to a portable device, the user may realize a more convenient, enjoyable and interactive experience while consuming media via a television.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that PII is removed. For example, a user's identity may be treated so that no PII can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
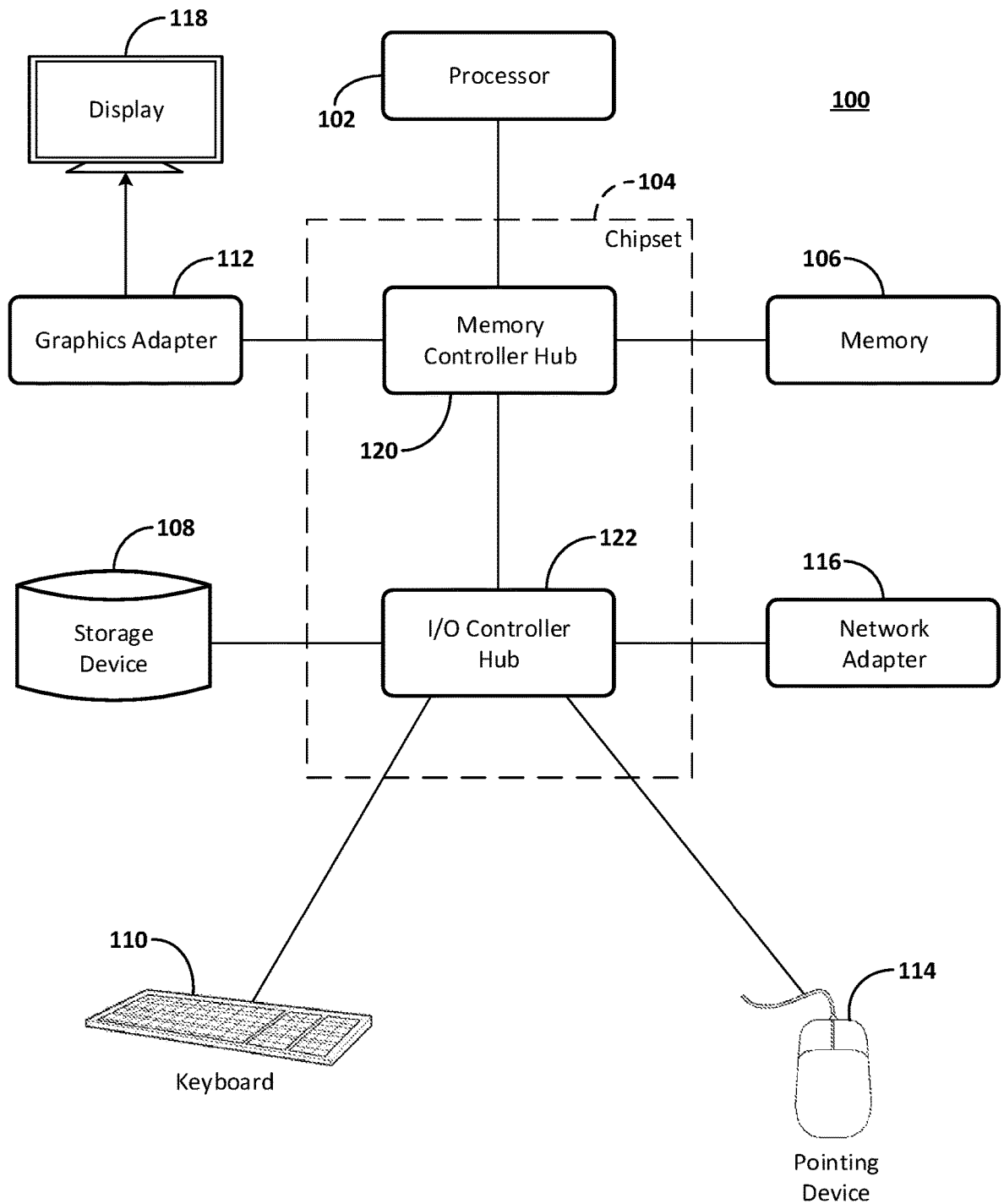
FIG. 1 is a block diagram illustrating an example computer.

FIG. 1 is a diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
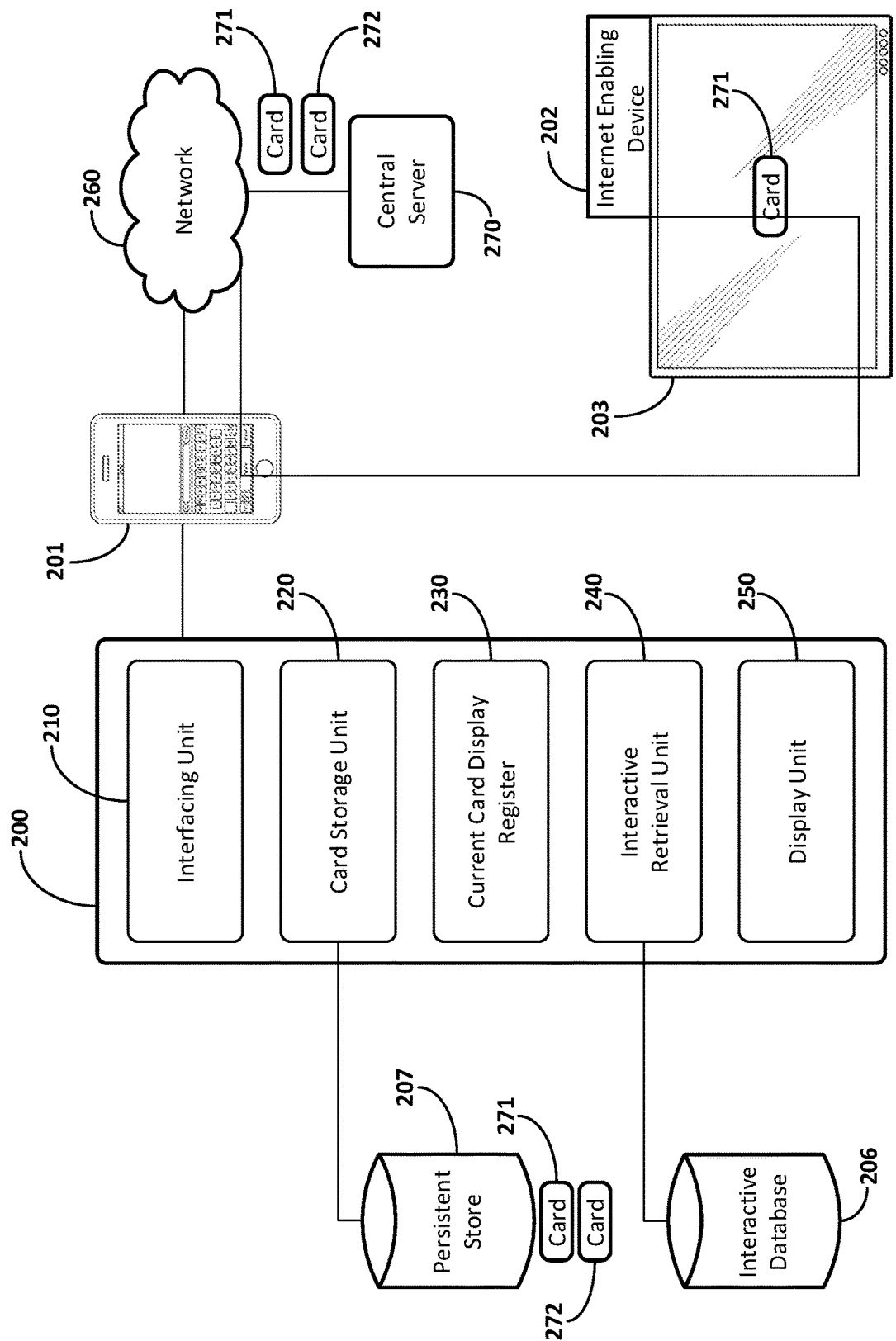
FIG. 2 illustrates an example of a system for interfacing a television with a second device.

FIG. 2 is an example of a system 200 for interfacing a television 203 with a second device (user device 201). The system 200 includes an interfacing unit 210, a card storage unit 220, a current card display register 230, an interactive retrieval unit 240, and a display unit 250. The system 200 may be implemented on a user device 201, such as computer 100 described in FIG. 1.

The user device 201 may communicate via a network 260, such as the Internet, to a central server 270. The central server 270 may communicate with the television 203 via the network 260 and an Internet enabling device 202. The Internet enabling device 202 may retrieve data from the central server 270, and direct the television to present the data.

Alternatively, the Internet enabling device 202 may be equipped with content-id, thereby allowing the Internet enabling device 202 to communicate with the central server 270 a detection of the content being served by the television 203.

The interfacing unit 210 receives activation by the user device 201 to allow system 200 to interface with the television 203. The activation may be triggered by a user activating a button or icon associated with system 200. Alternatively, the activation may be automatic based on a detection of the user device 201 being within the presence of the television 203.

Once the interfacing unit 210 is activated, the system 200 may receive cards associated with the content being display via television 203. The cards may correspond to data served to the television 203 from the central server 270. As shown in FIG. 2, card 271 is being presented via television 203.

The cards may refer to any sort of data associated with a presentation via television 200. Thus, if television 203 accesses a slideshow of content via the central server 270, the cards may represent the various discrete data items associated with the slideshow. Thus, each card may represent a picture, news item, or other content served via the television 203.

Alternatively, the card may be sourced from the television 203. If the system 203 is in content-id mode, a content-id card may be delivered to the central server 270, and then delivered to the user device 201. The content-id card indicates a detection of a current program being broadcast or served by the television 203.

The card storage unit 220 stores a history of the cards served to the television 203. The system 200 receives the cards, such as card 271 and card 272, and stores the cards in a persistent store 205. The persistent store 205 may be any of the storage devices enumerated above in regards to storage device 108.

By maintaining a history of all or some of the cards associated with television 203, the system 200 presents an option of accessing cards previously served via television 203. For example, card 271 is presently being served in the example shown FIG. 2, with card 272 being previously served. By storing a history of the cards served, system 200 allows the user device 201 to scroll through the cards that were previously served.

The current card display register 230 stores, via a register or storage device, a record of the current card being displayed via television 203. In the example shown in FIG. 2, card 271 is currently being displayed, and thus, card 271 is stored in the current card display register 230. Once a new card replaces card 271 on television 203, the current card display register 230 updates accordingly.

The interactive retrieval unit 240 retrieves interactive data associated with the card being accessed. The interactive retrieval unit 240 may store correlations with each card in the interactive database 206. Thus, when a card, such as card 271, is being served via the television 203, the interactive database 206 also may store functionality associated with the card.

For example, different cards may have different functionality associations. A card is directed to a slideshow picture may have a zoom function, a share function, a posting function (via an online social network), and the like.

Conversely, if the card is directed to a content-id item, the card may be associated with a program identification function, an actor database function, an ecommerce link to purchase additional content associated with the content-id, and the like.

The functions are not limited to the ones enumerated above, and may be configured and implemented based on an implementer of system 200's preference.

The display unit 250 displays either the present card 271, or if the user device 201 performs a scrolling operation, displays a previous card, such as card 272. The display unit 250 displays the buttons or augmented data based on the interactive function associated with the displayed card.

Figure 3:
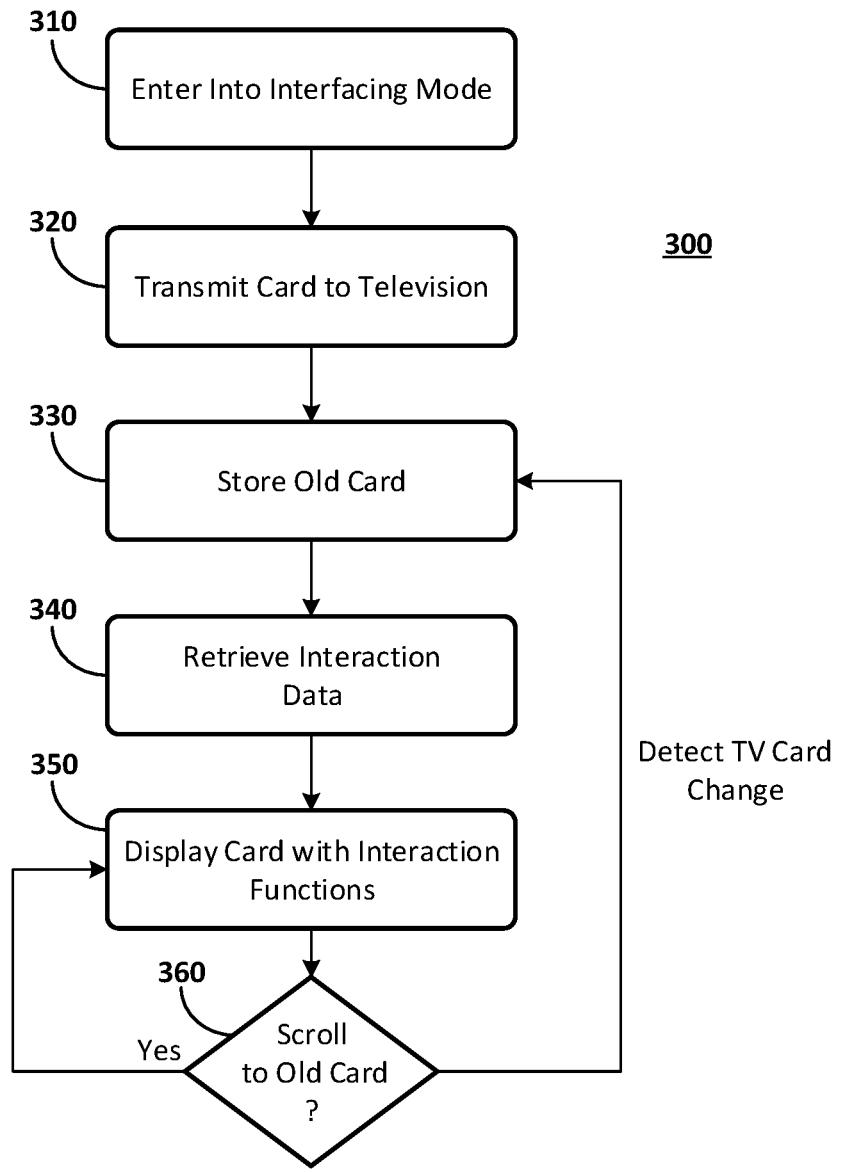
FIG. 3 illustrates an example of a method for interfacing a television with a second device.

FIG. 3 is an example method 300 for interfacing a television with a second device. The method may be implemented on the system 200.

In operation 310, an interfacing mode is selected to enter into. The mode may be entered into manually by a user option, or automatically by the second device being in a proximal distance from the television. The second device and the television (via an internet enabling device), may receive data and communicate via a central server.

In operation 320, a card is transmitted to the television to display. The same card may also be transmitted to the second device. Thus, in operation 320, the second device receives a card associated with the current display of the television.

In operation 330, if the method 300 was already in the interfacing mode, and a card was already received, the old card is stored. In operation 340, interactive data is retrieved associated with the card. The interactive data retrieved may be contingent on the object the card is associated with.

In operation 350, the second device displays the card and displays the interactive functions associated with the card. Thus, a user of the second device may operate any of the interactive functions to augment or enhance an experience associated with viewing the card on the television.

In operation 360, the second device is presented an option of maintaining the display of the presently viewed card, or access a previously stored card. If the user, decides to access previous cards, the user of the second device may scroll or swipe through a collection of the previous cards. The interactive data associated with the previous cards is also stored, so when a user selects one of the previous cards to access, the user will also be presented the interactive data associated with the previously stored card.

If a new card is displayed on the television, the method 300 returns to operation 330.

Figure 4:
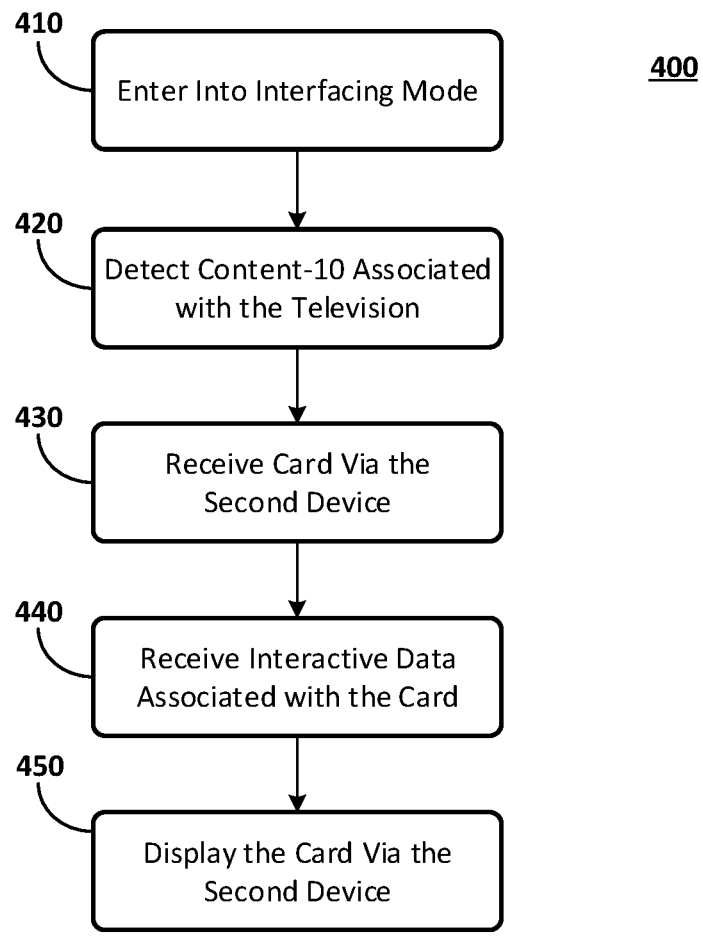
FIG. 4 illustrates an example of a method for interfacing a television with a second device.

FIG. 4 is an example method 400 for interfacing a television with a second device. The method may be implemented on the system 200.

Operation 410 is substantially similar to operation 310, and thus, a description will be omitted.

In operation 420, a content-id detection is performed on the content being served via the television. In operation 430, a card associated with the content-id is received by the second device. The card may contain identifying information about the program or broadcast being served by the television.

In operation 440, interactive data associated with the content-id card is retrieved. For example, the interactive data may be a link to access more information about the program, a link to access information about the actors in the program, or the like.

Figure 5:
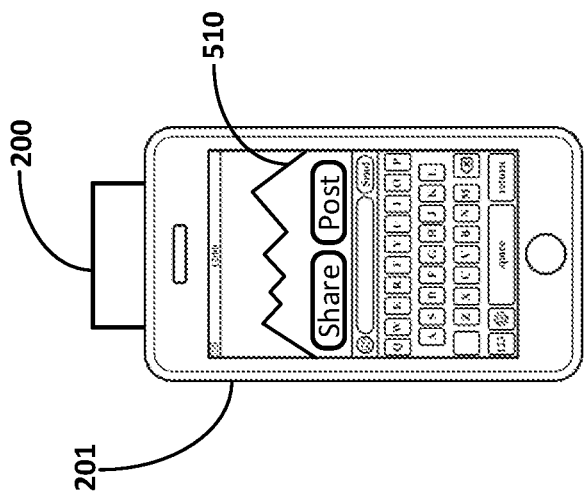
FIG. 5 illustrates an example implementation of the system in FIG. 2.
Figure 5:
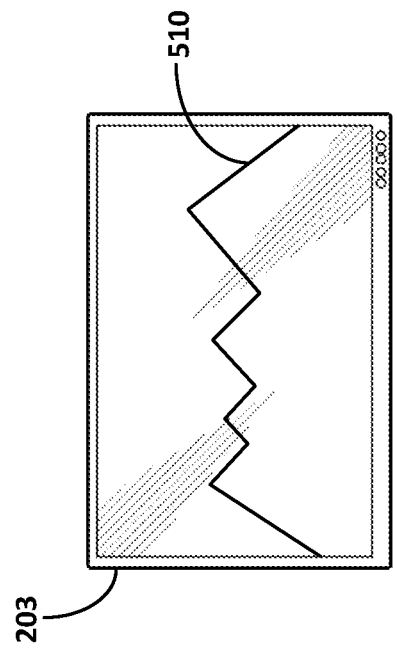

FIG. 5 illustrates an example implementation of system 200. FIG. 5 includes user device 201, Internet enabling device 202, television 203, and system 200.

In FIG. 5, the television 203 is set to a slideshow mode. Currently shown on the television 203 is one of the photos 510 associated with the slideshow, a picture of a mountain. Simultaneously, based on a transmission from a central server, the user device 201 shows the same picture of the photo 510. As shown, the user device's presentation of flower 510 is augmented by several functions, such as a 'share with friend' button 511 and a 'post on a social network' button 512.

Thus, according to the aspects disclosed herein, a user associated with a device on their person while viewing television is presented an interactive experience, while potentially maximizing their enjoyment by having content delivered via a television.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

What is claimed is:

1. A method for interfacing devices, comprising:
   detecting, using a mobile device that includes a hardware processor and a mobile display, a display device that is proximal to the mobile device over a communications network, wherein the display device is presenting media content;
   causing, using the hardware processor, the mobile device to be communicatively coupled to the display device;
   causing, using the hardware processor, a first card interface to be presented on the mobile display, wherein the first card interface relates to a first media content item currently being presented on the display device and wherein the first card interface includes a first set of interactive functions associated with the media content currently being presented on the display device;
   in response to a second media content item being presented on the display device, causing, using the hardware processor, a second card interface to be presented on the mobile display, wherein the second card interface that relates to the second media content item currently being presented on the display device and wherein the second card interface includes a second set of interactive functions associated with the second card interface;
   receiving, using the hardware processor, an input on the mobile display of the mobile device that corresponds to a request to present the previously presented first card interface and the associated first set of interactive functions for a second time;
   in response to receiving the input on the mobile display of the mobile device, retrieving, using the hardware processor, the previously presented first card interface from a local memory of the mobile device; and
   causing, using the hardware processor, the first card interface and the associated first set of interactive functions to be presented for the second time on the mobile display.

2. The method of claim 1, further comprising transmitting the first card interface and the associated first set of interactive functions to the display device over the communications network for presentation on the display device.

3. The method of claim 2, further comprising transmitting the second card interface and the associated second set of interactive functions to the display device over the communications network for presentation on the display device, wherein the first card interface is no longer presented on the display device and the second card interface replaces the first card interface.

4. The method of claim 1, further comprising, in response to receiving the input on the mobile display of the mobile device, causing the first card interface and the associated first set of interactive functions to be presented for the second time on the display device.

5. The method of claim 1, further comprising storing the first card interface and the second card interface in the local memory of the mobile device.

6. The method of claim 1, wherein the first card interface identifies the first media content item being presented on the display device.

7. The method of claim 1, wherein at least one of the first set of interactive functions is a function to share information associated with the first card interface via a social networking service associated with the mobile device.

8. The method of claim 1, wherein the first set of interactive functions is identified based on content presented on the first card interface.

9. The method of claim 1, wherein the display device is detected based on a distance between the mobile device and the display device.

10. A system for interfacing devices, the system comprising:
    a hardware processor that is programmed to:
    detect a display device that is proximal to a mobile device over a communications network, wherein the display device is presenting media content;
    cause the mobile device to be communicatively coupled to the display device;
    cause a first card interface to be presented on a mobile display of the mobile device, wherein the first card interface relates to a first media content item currently being presented on the display device and wherein the first card interface includes a first set of interactive functions associated with the media content currently being presented on the display device;

in response to a second media content item being presented on the display device, cause a second card interface to be presented on the mobile display, wherein the second card interface that relates to the second media content item currently being presented on the display device and wherein the second card interface includes a second set of interactive functions associated with the second card interface;

receive an input on the mobile display of the mobile device that corresponds to a request to present the previously presented first card interface and the associated first set of interactive functions for a second time;

in response to receiving the input on the mobile display of the mobile device, retrieve the previously presented first card interface from a local memory of the mobile device; and cause the first card interface and the associated first set of interactive functions to be presented for the second time on the mobile display.

11. The system of claim 10, wherein the hardware processor is further configured to transmit the first card interface and the associated first set of interactive functions to the display device over the communications network for presentation on the display device.

12. The system of claim 11, wherein the hardware processor is further configured to transmit the second card interface and the associated second set of interactive functions to the display device over the communications network for presentation on the display device, wherein the first card interface is no longer presented on the display device and the second card interface replaces the first card interface.

13. The system of claim 10, wherein the hardware processor is further configured to, in response to receiving the input on the mobile display of the mobile device, cause the first card interface and the associated first set of interactive functions to be presented for the second time on the display device.

14. The system of claim 10, wherein the hardware processor is further configured to store the first card interface and the second card interface in the local memory of the mobile device.

15. The system of claim 10, wherein the first card interface identifies the first media content item being presented on the display device.

16. The system of claim 10, wherein at least one of the first set of interactive functions is a function to share information associated with the first card interface via a social networking service associated with the mobile device.

17. The system of claim 10, wherein the first set of interactive functions is identified based on content presented on the first card interface.

18. The system of claim 10, wherein the display device is detected based on a distance between the mobile device and the display device.

19. A non-transitory computer-readable medium containing computer executable instructions that, when executed by a processor, cause the processor to execute a method for interfacing devices, the method comprising:

detecting a display device that is proximal to a mobile device over a communications network, wherein the display device is presenting media content;

causing the mobile device to be communicatively coupled to the display device;

causing a first card interface to be presented on a mobile display of the mobile device, wherein the first card interface relates to a first media content item currently being presented on the display device and wherein the first card interface includes a first set of interactive functions associated with the media content currently being presented on the display device;

in response to a second media content item being presented on the display device, causing a second card interface to be presented on the mobile display, wherein the second card interface that relates to the second media content item currently being presented on the display device and wherein the second card interface includes a second set of interactive functions associated with the second card interface;

receiving an input on the mobile display of the mobile device that corresponds to a request to present the previously presented first card interface and the associated first set of interactive functions for a second time;

in response to receiving the input on the mobile display of the mobile device, retrieving the previously presented first card interface from a local memory of the mobile device; and causing the first card interface and the associated first set of interactive functions to be presented for the second time on the mobile display.

* * * * *